United States Patent
Zhou et al.

(10) Patent No.: US 10,637,964 B2
(45) Date of Patent: Apr. 28, 2020

(54) MUTUAL REINFORCEMENT OF EDGE DEVICES WITH DYNAMIC TRIGGERING CONDITIONS

(71) Applicant: SAP SE, Walldorf (DE)

(72) Inventors: Wenjun Zhou, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 15/360,577

(22) Filed: Nov. 23, 2016

(65) Prior Publication Data

US 2018/0145895 A1    May 24, 2018

(51) Int. Cl.
*H04L 29/08* (2006.01)
*H04L 12/24* (2006.01)
*H04L 12/26* (2006.01)

(52) U.S. Cl.
CPC ........ *H04L 67/327* (2013.01); *H04L 41/0681* (2013.01); *H04L 43/08* (2013.01); *H04L 67/104* (2013.01)

(58) Field of Classification Search
CPC .. H04L 43/0876; H04L 67/104; H04L 67/327
USPC ........................................................ 709/224
See application file for complete search history.

(56) References Cited

U.S. PATENT DOCUMENTS

| | | | |
|---|---|---|---|
| 5,524,077 A | 6/1996 | Faaland et al. |
| 7,089,071 B2 | 8/2006 | Lilly et al. |
| 7,246,009 B2 | 7/2007 | Hamblen et al. |
| 7,660,651 B2 | 2/2010 | Zhong |
| 8,069,086 B2 | 11/2011 | von Helmolt et al. |
| 8,140,592 B2 | 3/2012 | Scott et al. |
| 8,219,546 B2 | 7/2012 | Yan et al. |
| 8,306,838 B2 | 11/2012 | Heise et al. |
| 8,332,390 B2 | 12/2012 | Yan et al. |
| 8,612,180 B2 | 12/2013 | Yan et al. |
| 8,650,340 B2 | 2/2014 | Yan et al. |
| 8,660,949 B2 | 2/2014 | Li et al. |
| 8,744,888 B2 | 6/2014 | Li et al. |
| 8,775,397 B2 | 7/2014 | Dong et al. |
| 8,788,501 B2 | 7/2014 | Li et al. |
| 8,868,497 B2 | 10/2014 | Yan et al. |
| 8,914,802 B2 | 12/2014 | Li et al. |

(Continued)

OTHER PUBLICATIONS

U.S. Appl. No. 14/050,833, filed Oct. 10, 2013, Li et al.

(Continued)

*Primary Examiner* — Benjamin M Thieu
*Assistant Examiner* — Leon Y Tseng
(74) *Attorney, Agent, or Firm* — Fish & Richardson P.C.

(57) ABSTRACT

The present disclosure involves systems, software, and computer implemented methods for mutual reinforcement of edge devices with dynamic triggering conditions and/or computation frequencies. In one example, a first edge device in multiple edge devices in an Internet of Things (IoT) system monitors at least a first parameter. The first edge device determines whether a first condition from one set of conditions is satisfied based on at least the monitored first parameter. In response to determining that the first condition is satisfied, the first edge device automatically transmits a signal to a second edge device in the multiple edge devices to initiate or stop monitoring of a second parameter by the second edge device.

20 Claims, 4 Drawing Sheets

(56) References Cited

U.S. PATENT DOCUMENTS

| | | |
|---|---|---|
| 2003/0004747 A1 | 1/2003 | Burton |
| 2003/0060924 A1 | 3/2003 | Ye et al. |
| 2005/0148828 A1* | 7/2005 | Lindsay .................. A61B 5/00 600/300 |
| 2007/0239297 A1 | 10/2007 | Degbotse et al. |
| 2010/0325281 A1 | 12/2010 | Li et al. |
| 2011/0173042 A1 | 7/2011 | Riepshoff et al. |
| 2012/0066019 A1 | 3/2012 | Hinshaw et al. |
| 2013/0066455 A1 | 3/2013 | Li et al. |
| 2013/0117752 A1 | 5/2013 | Li et al. |
| 2014/0019186 A1 | 1/2014 | Li et al. |
| 2014/0067601 A1 | 3/2014 | Li et al. |
| 2014/0101024 A1 | 4/2014 | Li et al. |
| 2014/0241354 A1* | 8/2014 | Shuman ................ H04L 67/16 370/390 |
| 2014/0279662 A1 | 9/2014 | Wang et al. |
| 2014/0379520 A1 | 12/2014 | Nemery et al. |
| 2014/0379638 A1 | 12/2014 | Li et al. |
| 2015/0002304 A1 | 1/2015 | Sun et al. |
| 2015/0006292 A1 | 1/2015 | Li et al. |
| 2015/0006553 A1 | 1/2015 | Li et al. |
| 2015/0022357 A1* | 1/2015 | Gettings ................ G01N 21/84 340/568.1 |
| 2017/0063566 A1* | 3/2017 | Seminario .......... H04L 12/2816 |
| 2018/0284735 A1* | 10/2018 | Cella ................ G05B 19/41875 |

OTHER PUBLICATIONS

U.S. Appl. No. 14/055,565, filed Oct. 16, 2013, Li et al.
U.S. Appl. No. 14/465,239, filed Aug. 21, 2014, Wang et al.
U.S. Appl. No. 14/532,330, filed Nov. 4, 2014, Cheng et al.
U.S. Appl. No. 14/567,458, filed Dec. 11, 2014, Wu et al.

* cited by examiner

MUTUAL REINFORCEMENT OF EDGE DEVICES WITH DYNAMIC TRIGGERING CONDITIONS

TECHNICAL FIELD

The present disclosure relates to systems, software, and computer-implemented methods for mutual reinforcement of edge devices with dynamic triggering conditions and/or computation frequencies in an edge wireless network.

Edge computing is important for Internet of Things (IoT). With edge computing, many calculations can be performed close to things (e.g., at particular edge devices) without sending data to a central server for data analysis and the subsequent wait for the receipt of responsive decisions back from the central server.

SUMMARY

The present disclosure describes methods and systems, including computer-implemented methods, computer program products, and computer systems for mutual reinforcement of edge devices with dynamic triggering conditions and/or computation frequencies.

In an implementation, an initializer connected to multiple edge devices in an Internet of Things (IoT) system transmits a signal to a first edge device in the multiple edge devices to initiate monitoring of at least a first parameter (e.g., smoke, temperature) and computing on or related to the monitored first parameter (e.g., whether the first parameter is in normal condition, whether the first parameter is in warning condition, whether the first parameter in fatal condition, etc.). The first edge device is not monitoring the first parameter prior to the transmission of the signal from the initializer to the first edge device. Once initialized, the first edge device can trigger other edge devices to start or stop monitoring and/or computing based on multiple triggering conditions without the need of a central control server. For example, the first edge device can monitor the first parameter, determine that a first trigger condition among the multiple trigger conditions is satisfied based on the monitored first parameter, and in response to the determination, automatically transmit a signal to a second edge device in the multiple edge devices to start or stop monitoring of a second parameter. In addition, the first edge device can monitor the first parameter over time at a time interval, determine that a second trigger condition among the multiple trigger conditions is satisfied based on the monitored first parameter, and in response to the determination, change the time interval of monitoring the first parameter.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions being stored on the non-transitory, computer-readable medium.

The subject matter described in this specification can be implemented in particular implementations so as to realize one or more of the following advantages. First, the systems and/or methods described in the present disclosure can increase the accuracy of edge computing performed in an edge wireless network. In general, one edge device monitors one parameter (for example, a temperature edge device monitors temperature). Calculating or predicting a condition (e.g., fire) by one edge device based on one parameter may not be accurate. In order to provide more accurate calculation or prediction, the one edge device may trigger another edge device to monitor another parameter in response to particular conditions being detected at the one edge device, where the one edge device and the other edge device can perform the calculation or prediction together. For example, both a smoke edge device and a temperature edge device are initialized to work together in order to provide an accurate fire alert. Second, the systems and/or methods described in the present disclosure can balance calculation load among multiple edge devices. With mutual reinforcement, the multiple edge devices can work together to avoid putting calculation on only one or a few edge devices. Edge devices that are idle (e.g., in the "stopped" status) can be triggered to share the calculation load while edge devices that are running for some time can decrease their computation frequencies (i.e., increase computation interval) to decrease their calculation load. Third, the systems and/or methods described in the present disclosure can save energy for the whole edge wireless network. When monitoring one condition in which several parameters need to exceed their corresponding limits simultaneously in order for a particular alert to be determined to occur, not all edge devices in the edge wireless network need to work at the same time. One edge device can be identified to initially monitor and calculate a sub-condition without the need for a second edge device to operate. If the sub-condition is not satisfied, there is no need to wake up or initialize other edge devices that are part of the particular alert evaluation. However, if the sub-condition is satisfied (e.g., the monitored parameter exceeds its limit), the edge device can wake up some or all other edge devices to monitor and/or calculate the current status together. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
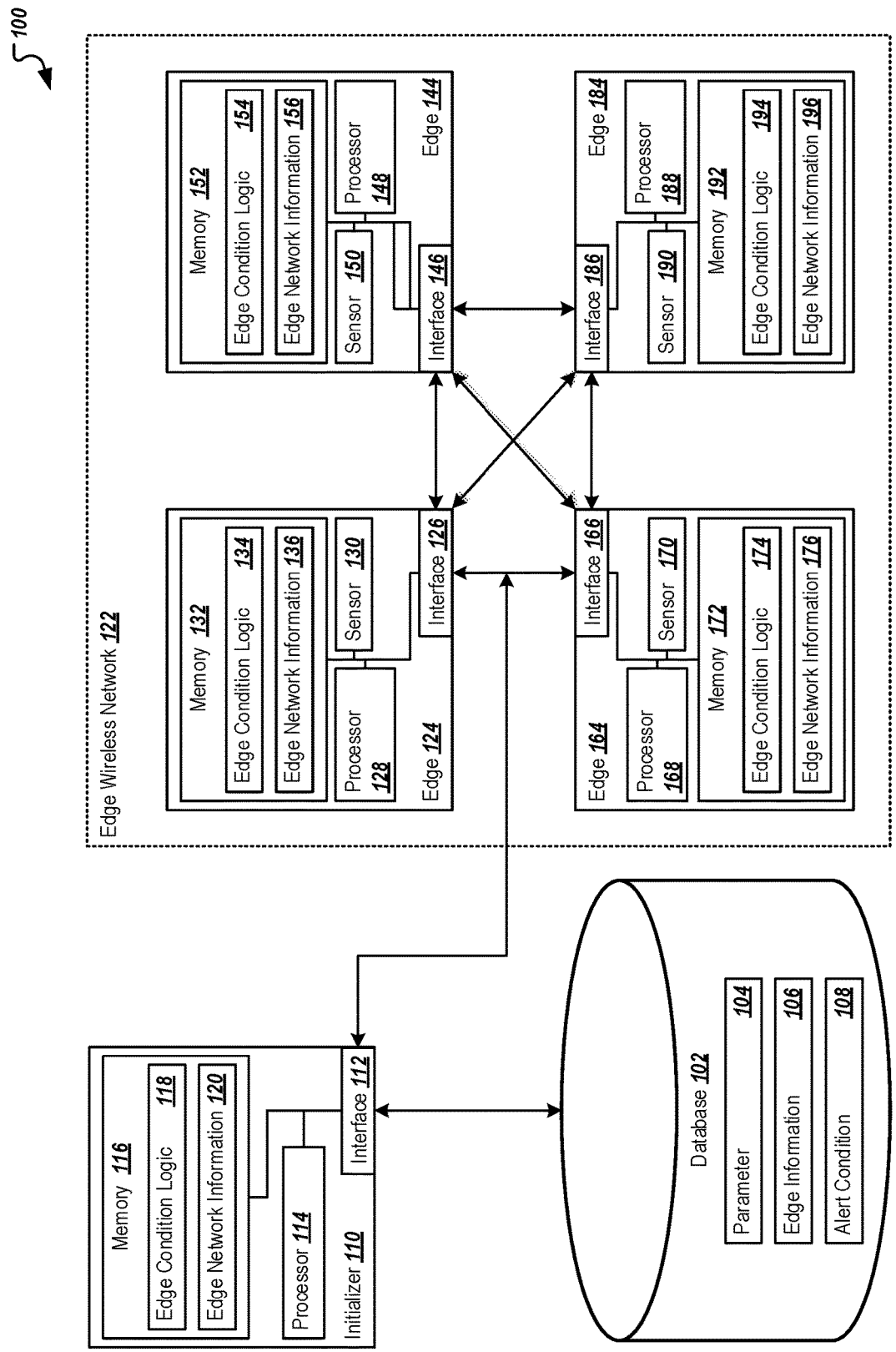
FIG. 1 is a block diagram illustrating an example system for mutual reinforcement of edge devices, according to an implementation.

The following detailed description describes mutual reinforcement of edge devices with dynamic triggering conditions and/or computation frequencies. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

In an edge wireless network, edge devices can communicate with each other wirelessly, e.g., to initiate operations of other edge devices, identify particular calculations or parameter readings, or to change monitoring intervals, where appropriate. Instead of transmitting calculation results of an alert condition back to a central control server for analysis, edge devices can communicate with each other to work together to calculate or predict alert conditions autonomously. For example, once initialized by an initializer at the beginning of operations, an edge device in the edge wireless network starts monitoring a parameter associated with the alert condition, and calculating the alert condition relative to that edge device based on one or more parameters monitored by the edge device. Monitoring can occur at a pre-determined time interval or in response to particular events. When the monitored parameter satisfies (e.g., matches, exceeds, or falls below) a pre-determined limit or value, a different parameter associated with the alert condition may need to be monitored for a complete and accurate calculation or prediction of the alert condition based on a defined edge condition logic. As a result, the edge device identifies another edge device, which is idle, in the edge wireless network, and triggers the another edge device to start monitoring the different parameter. Both edge devices, then, can work together on calculating or predicting the alert condition based on the two monitored parameters. Later, when the monitored parameter falls below the pre-determined limit, the edge device can trigger the another edge device to stop monitoring the different parameter. In some instances, the edge condition logic may cause the "another" edge device to remain in an active state while the original edge device is placed into a standby operation mode. In addition to triggering another edge device to start or stop monitoring, the edge device can adjust its monitoring and/or calculating time interval based on historical data and current data of the monitored and/or calculated parameter. By doing so, the edge wireless network and its edge devices becomes an autonomous edge network, in which edge devices can work together, based on the edge condition logic without the need of a central control server.

The notations used in the present disclosure are summarized in Table 1 below.

TABLE 1

| Notation | Description |
|---|---|
| $P_i$ | Parameter i<br>i = 1, 2, . . . , N |
| $O_i$ | Normal condition of parameter i<br>i = 1, 2, . . . , N |
| $W_i$ | Warning condition of parameter i<br>i = 1, 2, . . . , N |
| $WU_i$ | Upper limit of warning condition of parameter i<br>i = 1, 2, . . . , N |
| $WL_i$ | Lower limit of warning condition of parameter i<br>i = 1, 2, . . . , N |
| $WF_i$ | Starting point of fatal condition of parameter i<br>$WF_i = \begin{cases} 1 & \text{if starting from the upper limit} \\ 0 & \text{otherwise} \end{cases}$<br>i = 1, 2, . . . , N |
| $F_i$ | Fatal condition of parameter i<br>i = 1, 2, . . . , N |

TABLE 1-continued

| Notation | Description |
|---|---|
| $E_j$ | Edge j<br>j = 1, 2, . . . , M |
| $T_j$ | Monitored and/or calculated parameter of edge j<br>j = 1, 2, . . . , M |
| $X_j$ | Minimum computing interval of edge j<br>j = 1, 2, . . . , M |
| $Y_j$ | Maximum computing interval of edge j<br>j = 1, 2, . . . , M |
| $I_j$ | Computing interval of edge j<br>j = 1, 2, . . . , M |
| $A_k$ | Alert condition k, k = 1, 2, . . . , L |
| $D_k$ | Details of alert condition k<br>k = 1, 2, . . . , L |
| U | Previous computing result |
| V | Current computing result |

As shown in Table 1, there are N parameters $P_i$, i=1, 2, . . . , N and M edge devices $E_j$, j=1, 2, . . . , M in an edge wireless network. The M edge devices can monitor and/or calculate the N parameters. In addition, there are normal condition $O_i$, warning condition $W_i$, and fatal condition $F_i$ associated with each parameter $P_i$. For example, if the monitored and/or calculated parameter $P_i$ is less than, or equal to, the corresponding lower limit of warning condition $WL_i$, the parameter $P_i$ is in the normal condition. If the monitored and/or calculated parameter $P_i$ is great than the corresponding lower limit of warning condition $WL_i$, but is less than the corresponding upper limit of warning condition $WU_i$, the parameter $P_i$ is in the warning condition. If the monitored and/or calculated parameter $P_i$ is great than, or equal to, the corresponding upper limit of warning condition $WU_i$, the parameter $P_i$ is in the fatal condition. There is alert condition $A_k$, which includes multiple conditions of some parameters. If the alert condition is met, an alert will be raised.

Turning to the illustrated embodiment, FIG. 1 is a block diagram illustrating an example system 100 for mutual reinforcement of edge devices with dynamic triggering conditions and/or computation frequencies. Specifically, the illustrated system 100 includes or is communicably coupled with a database 102, an initializer 110, and an edge wireless network 122. In operation, the initializer 110 accesses the database 102, identifies at least a portion of an edge condition logic 118 (e.g., an alert condition), determines which edge device(s) in the edge wireless network 122 to initialize for initial monitoring and/or calculating, and transmits instructions and/or the identified logic (or portions thereof) to the determined edge device(s). The instructions can cause the determined edge device(s) to initialize for monitoring and/or calculating initially. After receiving the instructions, the determined edge device(s) can start monitoring and/or calculating particular parameters, adjusting monitoring and/or calculating time interval, and triggering one or more other edge device(s) in the edge wireless network 122 to initialize for monitoring and/or calculating autonomously in response to the initial set of edge devices' monitoring operations. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, initializer 110 may be any computer or processing device such as, for example, a blade server, general-purpose personal computer (PC), Mac®, workstation, UNIX-based workstation, or any other suitable device. Moreover, the present disclosure contemplates computers other than general-purpose computers, as well as computers without conventional operating systems. Further, illustrated initializer 110 and edge devices in the edge wireless network 122 may each be adapted to execute any operating system, including Linux, UNIX, Windows, Mac OS®, Java™, Android™, or iOS. According to one implementation, the illustrated systems may also include, or be communicably coupled with, a communication server, an e-mail server, a web server, a caching server, a streaming data server, and/or other suitable server or computer.

The illustrated database 102 is used to store information associated with edge devices as well as information monitored and/or calculated by the edge devices in edge wireless network 122. Specifically, the database 102 includes parameter 104, edge information 106, and alert condition 108. In some implementations, the parameter 104 stores information of parameters including parameter identity, parameter name (e.g., temperature), unit of measurement (e.g., Celsius), normal condition, warning condition, and fatal condition, and others. Table 2 below illustrates an example set of parameters stored in one implementation.

TABLE 2

| Column name | Description |
| --- | --- |
| P_ID | Identity of parameter |
| Name | Name of parameter |
| Unit | Unit of measurement |
| N_C | Normal condition, e.g., value <=1 |
| W_C | Warning condition, e.g., 1 < value <2 |
| F_C | Fatal condition, e.g., value >=2 |

The edge information 106 stores information associated with particular edge devices, including edge identity, edge name, parameter(s) monitored and/or computed by the edge device, a minimum computing interval, and a maximum computing interval, among others. Table 3 below illustrates an example set of information stored for each edge device in one implementation.

TABLE 3

| Column name | Description |
| --- | --- |
| E_ID | Identity of edge |
| Name | Name of edge |
| Parameter ID | Identity of parameter, which parameter the edge monitors and/or calculates |
| Min interval | Minimum computing interval for the fatal condition |
| Max interval | Maximum computing interval for the normal condition |

The alert condition 108 stores the information relating to particular alert conditions, including alert condition identifiers, a name of the alert condition, and alert condition details, such as particular logical requirements for various alerts to be present. Table 4 below illustrates an example set of alert condition information stored for each edge device in one implementation.

TABLE 4

| Column name | Description |
| --- | --- |
| ID | Identity of alert condition |
| Name | Name of alert condition |
| A_C | Alert condition details, e.g., W_C (P_ID = 1) AND W_C (P_ID = 2) OR F_C (P_ID = 1) |

As illustrated in the example, the alert condition details (A_C) are represented by an expression of multiple conditions of different parameters. For example, an alert condition can be represented by an expression of (W_C (P_ID=1) AND W_C (P_ID=2)) OR (F_C (P_ID=1)). If both parameter 1 and parameter 2 are in warning condition, or if parameter 1 alone is in fatal condition, the alert condition is satisfied and an alert will be raised. Alert conditions involving three or more edge devices and/or parameters, as well as any other number of the same, may be used in alternative implementations as appropriate.

In some implementations, the database 102 may be a separate device or repository connected to the initializer 110 via a network (not shown in FIG. 1), e.g., the Internet. In some other implementations, the database 102 may be a component of the initializer 110, of the edge wireless network 122, or of another system entirely. In some implementations, the information stored in the database 102 is input by a user or administrator of the edge wireless network 122 via a user device (not shown) operable to connect to and/or communicate with the database 102 to identify particular alert conditions associated with edge devices in an edge wireless network 122.

As illustrated, initializer 110 includes an interface 112, a processor 114, and memory 116. The interface 112 is used by the initializer 110 for communicating with other systems in a distributed environment—including within the system 100—connected to the edge wireless network 122 (e.g., edge 124, edge 144, edge 164, edge 184, and other systems communicably coupled to the edge wireless network 122). The interface 112 may comprise logic encoded in software and/or hardware in a suitable combination and operable to communicate with the edge wireless network 122 and the database 102. More specifically, the interface 112 may comprise software supporting one or more communication protocols associated with communications, such that the initializer 110 is operable to communicate physical signals with the edge wireless network 122 or the database 102, or otherwise within and outside of the illustrated system 100.

As illustrated in FIG. 1, the initializer 110 includes a processor 114. Although illustrated as a single processor 114 in FIG. 1, two or more processors may be used according to particular needs, desires, or particular implementations of the system 100. Each processor 114 may be a central processing unit (CPU), an application-specific integrated circuit (ASIC), a field-programmable gate array (FPGA), or another suitable component. Generally, the processor 114 executes instructions and manipulates data to perform the operations of the initializer 110. Specifically, the processor 114 executes the algorithms and operations described in the illustrated figures, including the operations performing the functionality associated with the initializer 110 generally, as well as the various software modules, including the functionality for sending communications to and receiving transmissions from the edge wireless network 122.

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language including C, C++, JavaScript, Java™, Visual Basic, assembler, Perl®, any suitable version of 4GL, as well as others.

As illustrated, initializer 110 includes memory 116, or multiple memories 116. The memory 116 may include any memory or database module and may take the form of volatile or non-volatile memory including, without limitation, magnetic media, optical media, random access memory (RAM), read-only memory (ROM), removable media, or any other suitable local or remote memory component. The memory 116 includes edge condition logic 118 and edge network information 120. The edge condition logic 118 stores, for example, the alert condition details (A_C) the initializer 110 identified from the database 102. The edge network information 120 stores, for example, edge devices information and the network topology of the edge wireless network 122. For example, the initializer 110 knows how to communicate with a particular edge device using information stored in the edge network information 120.

In operation, the initializer 110 reads data from the database 102, identifies an alert condition that the edge wireless network 122 needs to monitor and/or calculate, determines which edge device(s) in the edge wireless network 122 to initially initialize for monitoring and/or calculating identified parameters and alert conditions, and transmits a signal to the determined edge device(s) to initiate that monitoring and/or calculating. In some implementations, the initializer 110 transmits the identified alert condition only to the determined edge device(s). In some implementations, the initializer 110 transmits the identified alert condition to all edge devices in the edge wireless network 122.

To determine which edge device(s) to initialize, the initializer 110 analyzes the alert condition and identifies the must-be-monitored sub-conditions from the alert condition. To illustrate the process, the following example is used. In one example, two edge devices are in the example edge wireless network: one edge device is a smoke edge with a minimum computing interval of 1 second and a maximum computing interval of 10 seconds, and the other edge device is a temperature edge with a minimum computing interval of 2 seconds and a maximum computing interval of 20 seconds. The identified alert condition is a fire alert condition with the following alert condition details: smoke warning condition (1<value<2) AND temperature warning condition (40<value<50) OR smoke fatal condition (value>=2).

The initializer can assume that all conditions in the alert condition are connected by the outer OR operators, and all sub-conditions are connected by the inner AND operators. For each identified alert condition $A_k$, the alert condition can be separated into alone condition(s) and combined condition(s). The alone condition connects to other conditions in the alert condition only by OR operator(s) and does not contain AND operator(s). The combined condition connects to other conditions in the alert condition only by OR operator(s) and contains at least one AND operator. The combined condition includes multiple sub-conditions. In a combined condition, one sub-condition is connected to another sub-condition by an AND operator. The sub-condition does not contain AND operator(s). The must-be-monitored sub-conditions can be identified, for example, with the following steps:

1) Assign a counter with zero value to each parameter;
2) For each alone condition (e.g., smoke fatal condition (value>=2)), increase the counter value by 1 for the parameter associated with the alone condition. In this example, counter value=1 for smoke;
3) For each combined condition, if no sub-condition in the particular combined condition has an associated parameter counter that is greater than 0, select one sub-condition and increase the counter value by 1 for the parameter associated with the selected sub-condition; otherwise do nothing. The one sub-condition can be selected randomly or based on a predetermined order among all sub-conditions in the particular combined condition. In this example, do nothing since one sub-condition (i.e., smoke warning condition (1<value<2)) has an associated smoke counter of 1;
4) For each sub-condition having an associated parameter counter that is greater than 0, trigger an edge device associated with the parameter to start monitoring and/or computing. In this example, trigger the smoke edge.

Once the initializer 110 triggers the determined edge device(s) to initiate monitoring and/or calculating, the edge devices in the edge wireless network 122 can work together autonomously based on the edge condition logic shared or transmitted by the initializer 110, and do not need help from a central control server. In some implementations, after the initialization by the initializer 110, the identified alert condition might change (e.g., user inputting an updated alert condition). In this situation, the initializer 110 may transmit the changed alert condition to non-idle edge device(s) (i.e., edge device(s) in the "running" status) or to all edge devices in the edge wireless network 122. If the updated alert conditions are only provided to the non-idle edge devices, then those non-idle edge devices, in response to determining that an initialization of another edge device is needed, can share the updated alert conditions to those devices as they are initialized. The process of identifying the must-be-monitored sub-conditions can be stored in the memory 116 (e.g., edge condition logic 118).

As illustrated, the system 100 includes an edge wireless network 122. The edge wireless network 122 facilitates wireless communications between the components of the edge wireless network 122 (e.g., between edge 124, edge 144, edge 164, edge 184, and among others). Example wireless links may include 802.11ac/ad/af/a/b/g/n, 802.20, WiMax, LTE, and/or any other appropriate wireless link. In the illustrated system, the edge wireless network 122 is depicted as a single network, but may be comprised of more than one network without departing from the scope of this disclosure, including dedicated networks between particular edge devices, so long as at least a portion of the edge wireless network 122 may facilitate communications between senders and recipients within the edge wireless network 122, as well as components external to the edge wireless network 122, where appropriate. In some implementations, at least a portion of the edge wireless network 122 may represent a connection to the Internet. In some implementations, the edge wireless network 122 may include one or more wired links among some components of the edge wireless network 122.

As illustrated, the edge wireless network 122 includes four edge devices: edge 124, edge 144, edge 164, and edge 184. There may be any other number of edge devices in the edge wireless network 122, including more or fewer than four edge devices. All edge devices are connected within the edge wireless network. Each edge device (e.g., edge 124) may be a particular thing within a group of the Internet of Things (IoT), such as a connected appliance, tool, sensors, or actuators, among others. In some implementations, each edge device (e.g., edge 124) may be any computing device operable to connect to or communicate with initializer 110, other edge devices, and/or other components (not illustrated) within the edge wireless network 122, using a wireline or wireless connection, and can include a desktop computer, a mobile device, a tablet, a server, a sensor, or any other suitable computer device. In general, edge 124 comprises an electronic computer device operable to receive, transmit, monitor, process, and store any appropriate data associated with the system 100 of FIG. 1.

As illustrated, edge 124 includes an interface 126, a processor 128, a sensor 130, and memory 132. Edge 144, edge 164, and edge 184 may be similar to or different than edge 124. In some implementations, edge 144, edge 164, and edge 184 may be different from edge 124 and include different components. Interface 126 and processor 128 may be similar to, or different than, the interface 112 and processor 114 described with regard to initializer 110. In general, processor 128 executes instructions and manipulates data to perform the operations of the edge 124. Specifically, the processor 128 can execute some or all of the algorithms and operations described in the illustrated figures, including the operations performing the functionality associated with the edge 124. Similarly, interface 126 provides the edge 124 with the ability to communicate with other systems in a distributed environment—including within the system 100—connected to the edge wireless network 122. Sensor 130 monitors and/or measures temperature, humidity, or other environment information of the edge wireless network 122.

Memory 132 may be similar to or different from memory 116 of the initializer 110. In general, memory 132 may store various objects or data, including any parameters, variables, algorithms, instructions, rules, constraints, or references thereto associated with the purposes of the edge 124. The memory 132 includes edge condition logic 134 and edge network information 136. The edge condition logic 134 stores, for example, the alert condition details (A_C) transmitted from the initializer 110. The edge network information 136 stores, for example, edge devices information and the network topology of the edge wireless network 122. For example, the edge 124 knows how to communicate with another edge device in the edge wireless network 122 using information stored in the edge network information 136.

In operation, once initialized (i.e., in the "running" status), edge 124 starts monitoring one or more parameters associated with an alert condition and calculating a condition of the monitored parameters at a pre-determined time interval or in response to particular events. For example, if the monitored parameter is in the normal condition, the computing interval is set to $Y_{edge124}$, the maximum computing interval of edge 124. When the monitored parameter exceeds a pre-determined limit (e.g., the monitored parameter changes from the normal condition to the warning condition), a different parameter associated with the alert condition may need to be monitored for accurately calculating or predicting the alert condition. As a result, the edge 124 identifies, for example, edge 144, which is idle (i.e., in the "stopped" status), in the edge wireless network 122 based on the alert condition from the edge condition logic 134 and triggers the edge 144 (i.e., in the "running" status) to initialize and start monitoring the different parameter. In addition, the edge 124 decreases its computing interval (e.g., from $Y_{edge124}$ to a value between $Y_{edge124}$ and $X_{edge124}$, the minimum computing interval of edge 124). Later, when the monitored parameter falls below the pre-determined limit (e.g., the monitored parameter changes from the warning condition to the normal condition), the edge 124 can trigger the edge 144 to stop monitoring the different parameter. In addition, the edge 124 increases its computing interval back to $Y_{edge124}$.

For each edge device, there are five operation processes performed by the particular edge device:
 Start computing
 Stop computing
 Keep computing interval
 Decrease computing interval (Increase computation frequency)
 Increase computing interval (Decrease computation frequency)

Each operation process may be triggered by various conditions. To illustrate the five operation processes, the same example described above with regard to the process of identifying the must-be-monitored sub-conditions is used. In this example, there are two edge devices in the edge wireless network: one edge device is a smoke edge with a minimum computing interval of 1 second and a maximum computing interval of 10 seconds, and the other edge device is a temperature edge with a minimum computing interval of 2 seconds and a maximum computing interval of 20 seconds. The identified alert condition is a fire alert condition with the following alert condition details: smoke warning condition (1<value<2) AND temperature warning condition (40<value<50) OR smoke fatal condition (value>=2).

Start Computing Operation:

There are two trigger conditions for the start computing operation: trigger condition 1 for start computing and trigger condition 2 for start computing. Trigger condition 1 for start computing is the initial trigger condition and is triggered by the system 100 (e.g., initializer 110) as described above with regard to the process of identifying the must-be-monitored sub-conditions. Trigger condition 2 for start computing is the subsequent trigger condition and is trigged by another edge device.

A second edge device can be triggered to start computing by a first edge device with the following conditions (i.e., trigger condition 2 for start computing):
 1) The second edge device is in the "stopped" status;
 2) The parameter that the second edge device is monitoring and/or calculating is in a combined condition (i.e., an AND expression);
 3) The parameter that the first edge device is monitoring and/or calculating satisfies a sub-condition in the combined condition (i.e., the AND expression).

For example, once the smoke edge is triggered by the initializer 110, the smoke edge starts monitoring and/or calculating the smoke parameter. The smoke parameter and the temperature parameter are in a combined condition (i.e., smoke warning condition (1<value<2) AND temperature warning condition (40<value<50)). Assume after some time, the smoke warning condition (i.e., smoke warning condition (1<value<2)) is satisfied and the temperature edge is in the "stopped" status. In order to determine whether the fire alert condition is satisfied, the temperature warning condition (i.e., temperature warning condition (40<value<50)) needs to be checked. Since trigger condition 2 for start computing is satisfied, the smoke edge triggers the temperature edge to start monitoring and/or calculating the temperature parameter.

Stop Computing Operation:

There are two trigger conditions for the stop computing operation: trigger condition 1 for stop computing and trigger condition 2 for stop computing. Both are triggered by another edge device.

Trigger condition 1 for stop computing: A second edge device can be triggered to stop computing by a first edge device with the following conditions (i.e., trigger condition 1 for stop computing):
1) The second edge device is in the "running" status;
2) The alert condition can be determined by the first edge device without the second edge device.

For example, once the temperature edge is triggered by the smoke edge as described above, both the smoke edge and the temperature edge are in the "running" status. Assume after some time, the smoke fatal condition (i.e., smoke fatal condition (value>=2)) is satisfied, the fire alert condition is satisfied. As a result, the smoke edge can determine the fire condition by itself and does not need the help of the temperature edge to make the determination while the smoke fatal condition is satisfied. Since trigger condition 1 for stop computing is satisfied, the smoke edge triggers the temperature edge to stop monitoring and/or calculating the temperature parameter.

Trigger condition 2 for stop computing: A second edge device can be triggered to stop computing by a first edge device when no sub-condition in the alert condition is satisfied. For example, both the smoke edge and the temperature edge are in the "running" status when the smoke is in the warning condition and the temperature is in the normal condition. Assume after some time, the smoke returns to the normal condition and the temperature keeps in the normal condition. As a result, no sub-condition (i.e., smoke warning condition (1<value<2), temperature warning condition (40<value<50)) in the fire alert condition is satisfied, there is no need for both the smoke edge and the temperature edge to be in the "running" status. Since trigger condition 2 for stop computing is satisfied, the smoke edge triggers the temperature edge to stop monitoring and/or calculating the temperature parameter.

Keep Computing Interval Operation:

There are three trigger conditions for the keep computing interval operation: trigger condition 1 for keeping computing interval, trigger condition 2 for keeping computing interval, and trigger condition 3 for keeping computing interval.

Trigger condition 1 for keeping computing interval: an edge device can keep its computing interval if both previous and current computing results are in the normal condition, such as the following:

$U \in O_i$ and $V \in O_i$.

The current computing result represents the most recent result of monitoring and/or calculating. The previous computing result represents the last, next to the most recent, result of monitoring and/or calculating. These results can be stored in a memory of the edge device (e.g., memory 132 of edge 124). For example, the smoke edge is in the "running" status and the smoke is in the normal condition. Assume the smoke keeps in the normal condition. Since trigger condition 1 for keeping computing interval is satisfied, the smoke edge can keep its computing interval (e.g., $I_j=Y_j$) while the smoke is in the normal condition.

Trigger condition 2 for keeping computing interval: an edge device can keep its computing interval if both previous and current computing results are in the fatal condition, such as the following:

$U \in F_i$ and $V \in F_i$.

For example, the smoke edge is in the "running" status and the smoke is in the fatal condition. Assume the smoke keeps in the fatal condition. Since trigger condition 2 for keeping computing interval is satisfied, the smoke edge can keep its computing interval (e.g., $I_j=X_j$) while the smoke is in the fatal condition.

Trigger condition 3 for keeping computing interval: an edge device can keep its computing interval if both previous and current computing results are in the warning condition and the results are the same, such as the following:

$U \in W_i$ and $V \in W_i$ and $U=V$.

For example, the smoke edge is in the "running" status and the smoke is in the warning condition. Assume the smoke keeps in the warning condition and the current computing result is the same as the previous current computing results. Since trigger condition 3 for keeping computing interval is satisfied, the smoke edge can keep its computing interval.

Decrease Computing Interval Operation:

There are three trigger conditions for the decrease computing interval operation: trigger condition 1 for decreasing computing interval, trigger condition 2 for decreasing computing interval, and trigger condition 3 for decreasing computing interval.

Trigger condition 1 for decreasing computing interval: an edge device will decrease its computing interval if previous computing result is in the normal condition and current computing result is in the fatal condition, such as the following:

If $U \in O_i$ and $V \in F_i$, $I_j=X_j$.

For example, the smoke edge is in the "running" status and the smoke is in the normal condition. Assume suddenly the smoke is in the fatal condition. Since trigger condition 1 for decreasing computing interval is satisfied, the smoke edge will decrease its computing interval (e.g., from the maximum computing interval $Y_j$ to the minimum computing interval $X_j$.)

Trigger condition 2 for decreasing computing interval: an edge device will decrease its computing interval if previous computing result is in the normal condition and current computing result is in the warning condition, such as the following:

If $U \in O_i$ and $V \in W_i$ and $WF_i = 1$, $$I_j = X_j + \frac{(WU_i - V)(Y_j - X_j)}{WU_i - WL_i};$$

If $U \in O_i$ and $V \in W_i$ and $WF_i = 0$, $$I_j = X_j + \frac{(V - WL_i)(Y_j - X_j)}{WU_i - WL_i}.$$

For example, the smoke edge is in the "running" status and the smoke is in the normal condition. Assume U=0.5 (i.e., previous computing result is in the normal condition) and V=1.2 (i.e., current computing result is in the warning condition). Since trigger condition 2 for decreasing computing interval is satisfied, the smoke edge will decrease its computing interval $$\left(\text{e.g., } I_j = 1 + \frac{(2-1.2)(10-1)}{2-1} = 8.2\right).$$

In this example, the computing interval is decreased proportionally, however, exponential decreasing, or any other form of relation can be used.

Trigger condition 3 for decreasing computing interval: an edge device will decrease its computing interval if both previous and current computing results are in the warning condition and current computing result is worse than previous computing result, such as the following:

If $U \in W_i$ and $V \in W_i$ and $U < V$ and $WF_i = 1$, $$I_j = X_j + \frac{(WU_i - V)(Y_j - X_j)}{WU_i - WL_i};$$

If $U \in W_i$ and $V \in W_i$ and $U > V$ and $WF_i = 0$, $$I_j = X_j + \frac{(V - WL_i)(Y_j - X_j)}{WU_i - WL_i}.$$

For example, the smoke edge is in the "running" status and the smoke is in the warning condition. Assume U=1.1 (i.e., previous computing result is in the warning condition) and V=1.2 (i.e., current computing result is in the warning condition). Since trigger condition 3 for decreasing computing interval is satisfied, the smoke edge will decrease its computing interval $$\left(\text{e.g., } I_j = 1 + \frac{(2 - 1.2)(10 - 1)}{2 - 1} = 8.2\right).$$

Increase Computing Interval Operation:

There are three trigger conditions for the increase computing interval operation: trigger condition 1 for increasing computing interval, trigger condition 2 for increasing computing interval, and trigger condition 3 for increasing computing interval.

Trigger condition 1 for increasing computing interval: an edge device will increase its computing interval if previous computing result is in the fatal condition and current computing result is in the normal condition, such as the following:

If $U \in F_i$ and $V \in O_i$, $I_j = Y_j$.

For example, the smoke edge is in the "running" status and the smoke is in the fatal condition. Assume suddenly the smoke is in the normal condition. Since trigger condition 1 for increasing computing interval is satisfied, the smoke edge will increase its computing interval (e.g., from the minimum computing interval $X_j$ to the maximum computing interval $Y_1$).

Trigger condition 2 for increasing computing interval: an edge device will increase its computing interval if previous computing result is in the fatal condition and current computing result is in the warning condition, such as the following:

If $U \in F_i$ and $V \in W_i$ and $WF_i = 1$, $$I_j = X_j + \frac{(WU_i - V)(Y_j - X_j)}{WU_i - WL_i};$$

If $U \in F_i$ and $V \in W_i$ and $WF_i = 0$, $$I_j = X_j + \frac{(V - WL_i)(Y_j - X_j)}{WU_i - WL_i}.$$

For example, the smoke edge is in the "running" status and the smoke is in the fatal condition. Assume U=2.5 (i.e., previous computing result is in the fatal condition) and V=1.8 (i.e., current computing result is in the warning condition). Since trigger condition 2 for increasing computing interval is satisfied, the smoke edge will increase its computing interval $$\left(\text{e.g., } I_j = 1 + \frac{(2 - 1.8)(10 - 1)}{2 - 1} = 2.8\right).$$

Trigger condition 3 for increasing computing interval: an edge device will increase its computing interval if both previous and current computing results are in the warning condition and current computing result is better than previous computing result, such as the following:

If $U \in W_i$ and $V \in W_i$ and $U > V$ and $WF_i = 1$, $$I_j = X_j + \frac{(WU_i - V)(Y_j - X_j)}{WU_i - WL_i};$$

If $U \in W_i$ and $V \in W_i$ and $U < V$ and $WF_i = 0$, $$I_j = X_j + \frac{(V - WL_i)(Y_j - X_j)}{WU_i - WL_i}.$$

For example, the smoke edge is in the "running" status and the smoke is in the warning condition. Assume U=1.9 (i.e., previous computing result is in the warning condition) and V=1.8 (i.e., current computing result is in the warning condition). Since trigger condition 3 for increasing computing interval is satisfied, the smoke edge will increase its computing interval $$\left(\text{e.g., } I_j = 1 + \frac{(2 - 1.8)(10 - 1)}{2 - 1} = 2.8\right).$$

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

Figure 2:
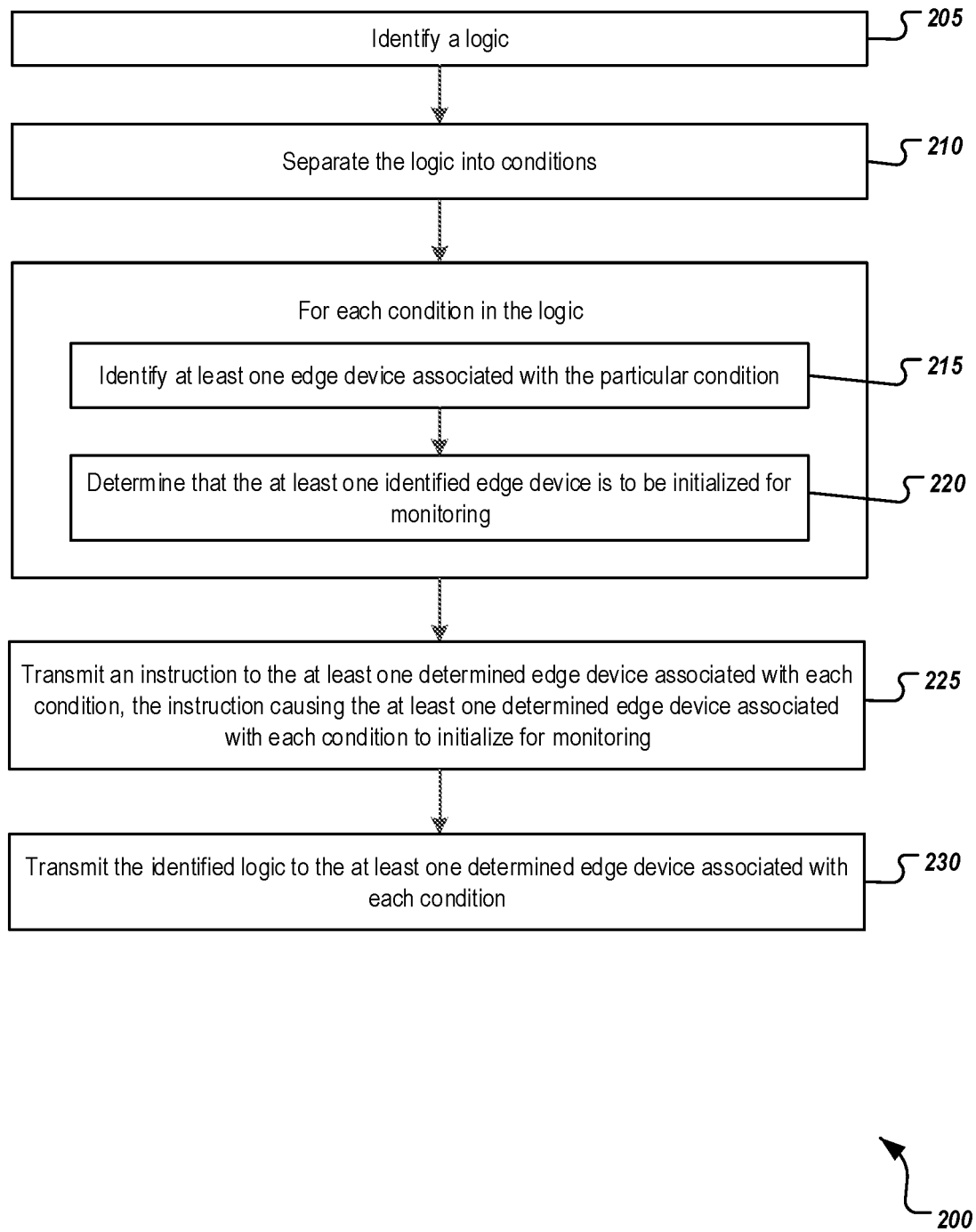
FIG. 2 is a flowchart of an example method for initializing, by an initializer, one or more edge devices for monitoring, according to an implementation.

FIG. 2 is a flowchart of an example method 200 for initializing, by an initializer, one or more edge devices for monitoring. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate. In some implementations, the method 200 and related methods are executed by one or more components of the system 100 described above with respect to FIG. 1. For example, the method 200 and related methods can be executed by the initializer 110 of FIG. 1.

At 205, a logic associated with an edge computing network is identified. The logic can be an alert condition that includes multiple conditions. For example, the logic can be a fire alert condition having the following expression: (W_C (P_ID=1) AND W_C (P_ID=2)) OR (F_C (P_ID=1)). Each condition is connected with another condition by an OR operator. Each condition is associated with one or more parameters (e.g., smoke, temperature) that need to be monitored and/or calculated. In addition, each condition is associated with one or more edge devices (e.g., smoke edge, temperature edge) that monitor and/or calculate the one or more parameters.

At 210, the logic is separated into conditions. For example, the above fire alert condition can be separated, based on OR operator(s), into two conditions: one being a combined condition (e.g., W_C (P_ID=1) AND W_C (P_ID=2)) and the other being an along condition (e.g., F_C (P_ID=1)). The above combined condition can be separated, based on AND operator(s), into two sub-conditions: one being W_C (P_ID=1) and the other being W_C (P_ID=2). For each condition in the logic, the following operations (i.e., 215 and 220) are performed. At 215, at least one edge device associated with the particular condition is identified. In some implementations, alone conditions (i.e., conditions (after separation at 210) with no AND operator) are processed first and combined conditions (i.e., conditions with at least one AND operator) are processed next. If none of multiple edge devices associated with a particular combined condition has been identified when processing the alone conditions, one of the multiple edge devices associated with the particular combined condition can be identified. The one edge device can be selected randomly or in any other manner from the multiple edge devices associated with the particular combined condition. Conversely, if one or more of the multiple edge devices associated with the particular combined condition have been identified when processing the alone conditions, the one or more edge device can be identified for the particular combined condition. At 220, a determination is made that the at least one identified edge device is to be initialized for monitoring.

At 225, an instruction is transmitted to the at least one determined edge device associated with each condition by the initializer. The instruction causes the at least one determined edge device associated with each condition to initialize for monitoring. At 230, the identified logic is also transmitted to the at least one determined edge device associated with each condition. In some implementations, the identified logic is transmitted to all edge devices within the edge device network, or to all edge devices associated with the particular identified logic (although not all edge devices within the edge device network).

The example method 200 shown in FIG. 2 can be modified or reconfigured to include additional, fewer, or different actions (not shown in FIG. 2), which can be performed in the order shown or in a different order. In some implementations, one or more of the actions shown in FIG. 2 can be repeated or iterated, for example, until a terminating condition is reached. In some implementations, one or more of the individual actions shown in FIG. 2 can be executed as multiple separate actions, or one or more subsets of the actions shown in FIG. 2 can be combined and executed as a single action. In some implementations, one or more of the individual actions shown in FIG. 2 may also be omitted from the example method 200. A benefit of the illustrated method 200 is that once the first set of edge devices are initialized, the edge devices associated with the identified logic may be able to operate autonomously without further input from or processing by the initializer.

Figure 3:
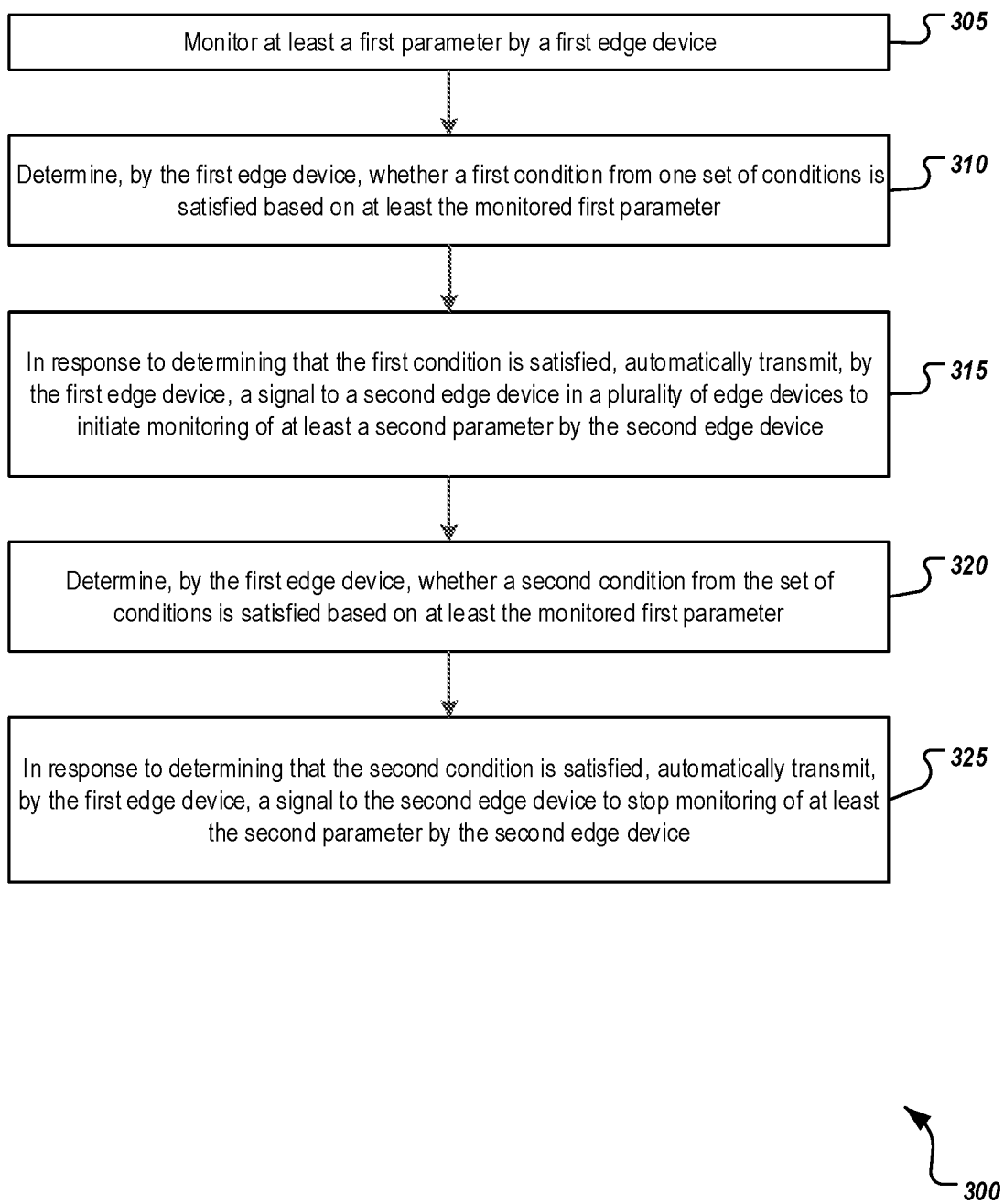
FIG. 3 is a flowchart of an example method for mutual reinforcement of edge devices with dynamic triggering conditions, according to an implementation.

FIG. 3 is a flowchart of an example method 300 for mutual reinforcement of edge devices with dynamic triggering conditions. It will be understood that method 300 and related methods may be performed, for example, by any suitable system, environment, software, and hardware, or a combination of systems, environments, software, and hardware, as appropriate. For example, an edge device or other suitable computing device can be used to execute method 300 and related methods and obtain any data from the memory of an edge device or the other computing device. In some implementations, the method 300 and related methods are executed by one or more components of the system 100 described above with respect to FIG. 1. For example, the method 300 and related methods can be executed by the edge 124 of FIG. 1.

At 305, at least a first parameter is monitored by a first edge device in multiple edge devices. The first edge is initialized for monitoring by an initializer (e.g., initializer 110). For example, the initializer transmits a signal to the first edge device to initiate monitoring of at least the first parameter according to a process described in FIG. 2. The first edge device may not be monitoring the first parameter prior to the transmission of the signal from the initializer to the first edge device. In some implementations, the first edge is initialized for monitoring by another edge device according to a process described below. The transmitted signal to the first edge device may include one set of conditions associated with other relationship to at least one other edge device, while in some instances, the first edge device may already have access to edge device logic identifying the set of conditions. In some implementations, the set of conditions includes multiple conditions combined with at least one logical operator (e.g., "AND", "OR"). In some implementations, the first edge device starts monitoring and goes into the "running" status.

At 310, a determination is made, by the first edge device, as to whether a first condition from the set of conditions is satisfied based on at least the monitored first parameter. For example, the first condition can be the trigger condition 2 for start computing as described above. At 315, in response to determining that the first condition is satisfied, a signal is automatically transmitted, by the first edge device, to a second edge device in the multiple edge devices according to the set of conditions to initiate monitoring of at least a second parameter by the second edge device. The second edge device is different than the first edge device, and the second parameter is different than the first parameter. The second edge device is not monitoring the second parameter prior to the transmission of the signal from the first edge device to the second edge device. In some implementations, the transmitted signal to the second edge device includes the set of conditions.

At 320, a determination is made, by the first edge device, as to whether a second condition from the set of conditions is satisfied based on at least the monitored first parameter. For example, the second condition can be any one of the two trigger conditions for the stop computing operation as described above. At 325, in response to determining that the second condition is satisfied, a signal is automatically transmitted, by the first edge device, to the second edge device to stop monitoring of at least the second parameter by the second edge device. In some implementations, the second edge device stops monitoring and goes into the "stopped" status.

The example method 300 shown in FIG. 3 can be modified or reconfigured to include additional, fewer, or different actions (not shown in FIG. 3), which can be performed in the order shown or in a different order. In some implementations, one or more of the actions shown in FIG. 3 can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action. In some implementations, one or more of the individual actions shown in FIG. 3 may also be omitted from the example method 300.

Figure 4:
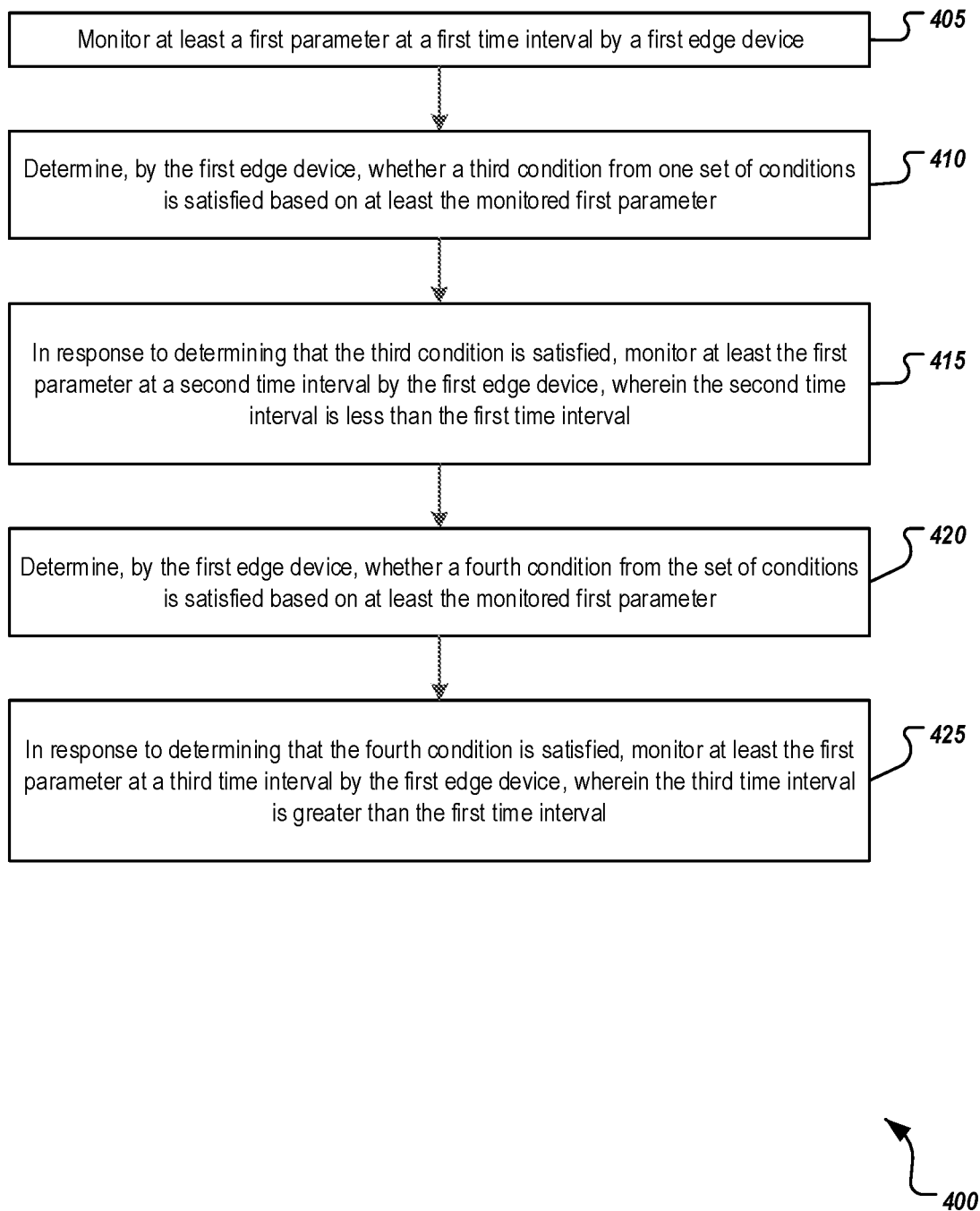
FIG. 4 is a flowchart of an example method for adjusting computation frequencies, according to an implementation.

FIG. 4 is a flowchart of an example method 400 for adjusting computation frequencies. It will be understood that method 400 and related methods may be performed, for example, by any suitable system, environment, software, and hardware, or a combination of systems, environments, software, and hardware, as appropriate. For example, one or more of an edge device or other suitable computing device can be used to execute method 400 and related methods and obtain any data from the memory of an edge device or the other computing device. In some implementations, the method 400 and related methods are executed by one or more components of the system 100 described above with respect to FIG. 1. For example, the method 400 and related methods can be executed by the edge 124 of FIG. 1.

At 405, at least a first parameter is monitored by a first edge device at a first time interval. The first edge is initialized for monitoring by an initializer (e.g., initializer 110). For example, the initializer transmits a signal to the first edge device to initiate monitoring of at least the first parameter according to a process described in FIG. 2. The first edge device is not monitoring the first parameter prior to the transmission of the signal from the initializer to the first edge device. In some implementations, the first edge device is initialized for monitoring by another edge device according to a process described in FIG. 3. The transmitted signal to the first edge device includes one set of conditions associated with other relationship to at least one other edge device. In some implementations, the transmitted signal to the first edge device includes the first time interval.

At 410, a determination is made, by the first edge device, as to whether a third condition from the set of conditions is satisfied based on at least the monitored first parameter. For example, the third condition can be any one of the three trigger conditions for the decrease computing interval operation as described above. At 415, in response to determining that the third condition is satisfied, at least the first parameter is monitored at a second time interval by the first edge device. The second time interval is less than the first time interval.

At 420, a determination is made, by the first edge device, as to whether a fourth condition from the set of conditions is satisfied based on at least the monitored first parameter. For example, the fourth condition can be any one of the three trigger conditions for the increase computing interval operation as described above. At 425, In response to determining that the fourth condition is satisfied, at least the first parameter is monitored at a third time interval by the first edge device. The third time interval is greater than the first time interval.

The example method 400 shown in FIG. 4 can be modified or reconfigured to include additional, fewer, or different actions (not shown in FIG. 4), which can be performed in the order shown or in a different order. In some implementations, one or more of the actions shown in FIG. 4 can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action. In some implementations, one or more of the individual actions shown in FIG. 4 may also be omitted from the example method 400.

Alternative methods of identifying object traits may be used in other implementations. Those described herein are examples and are not meant to be limiting.

Described implementations of the subject matter can include one or more features, alone or in combination.

For example, in a first implementation, a computer-implemented method includes monitoring, by a first edge device in multiple edge devices in an Internet of Things (IoT) system, at least a first parameter; determining whether a first condition from one set of conditions is satisfied based on at least the monitored first parameter, the set of conditions associated with other relationship to at least one other edge device; in response to determining that the first condition is satisfied, automatically transmitting a signal to a second edge device in the multiple edge devices to initiate monitoring of a second parameter.

The foregoing and other described implementations can each optionally include one or more of the following features:

A first feature, combinable with any of the following features, wherein an initializer connected to the multiple edge devices in the IoT system transmits a signal to the first edge device to initiate monitoring of the first parameter, and the first edge device is not monitoring the first parameter prior to the transmission of the signal from the initializer to the first edge device.

A second feature, combinable with any of the previous or following features, wherein the transmitted signal to the first edge device includes the set of conditions.

A third feature, combinable with any of the previous or following features, wherein the second edge device is not monitoring the second parameter prior to the transmission of the signal from the first edge device to the second edge device.

A fourth feature, combinable with any of the previous or following features, comprising determining whether a second condition from the set of conditions is satisfied; and in response to determining that the second condition is satisfied, automatically transmitting a signal to the second edge device to stop monitoring of the second parameter.

A fifth feature, combinable with any of the previous or following features, wherein the first edge device monitors the first parameter over time at a first time interval, comprising determining whether a third condition from the set of conditions is satisfied based on at least the monitored first parameter; and in response to determining that the third condition is satisfied, monitoring the first parameter at a second time interval, the second time interval being less than the first time interval.

A sixth feature, combinable with any of the previous or following features, wherein the first edge device monitors the first parameter over time at a first time interval, comprising determining whether a fourth condition from the set of conditions is satisfied based on at least the monitored first parameter; and in response to determining that the fourth condition is satisfied, monitoring the first parameter at a third time interval, the third time interval being greater than the first time interval.

A seventh feature, combinable with any of the previous or following features, wherein the set of conditions includes multiple conditions combined with at least one logical operator.

In a second implementation, a computer program product comprising computer-readable instructions, which, when loaded and executed on a computer system, cause the computer system to perform operations comprising: monitoring, by a first edge device in multiple edge devices in an Internet of Things (IoT) system, at least a first parameter; determining whether a first condition from one set of conditions is satisfied based on at least the monitored first parameter, the set of conditions associated with other relationship to at least one other edge device; in response to determining that the first condition is satisfied, automatically transmitting a signal to a second edge device in the multiple edge devices to initiate monitoring of a second parameter.

The foregoing and other described implementations can each optionally include one or more of the following features:

A first feature, combinable with any of the following features, wherein an initializer connected to the multiple edge devices in the IoT system transmits a signal to the first edge device to initiate monitoring of the first parameter, and the first edge device is not monitoring the first parameter prior to the transmission of the signal from the initializer to the first edge device.

A second feature, combinable with any of the previous or following features, wherein the transmitted signal to the first edge device includes the set of conditions.

A third feature, combinable with any of the previous or following features, wherein the second edge device is not monitoring the second parameter prior to the transmission of the signal from the first edge device to the second edge device.

A fourth feature, combinable with any of the previous or following features, comprising determining whether a second condition from the set of conditions is satisfied; and in response to determining that the second condition is satisfied, automatically transmitting a signal to the second edge device to stop monitoring of the second parameter.

A fifth feature, combinable with any of the previous or following features, wherein the first edge device monitors the first parameter over time, at a first time interval, comprising determining whether a third condition from the set of conditions is satisfied based on at least the monitored first parameter; and in response to determining that the third condition is satisfied, monitoring the first parameter at a second time interval, the second time interval being less than the first time interval.

A sixth feature, combinable with any of the previous or following features, wherein the first edge device monitors the first parameter over time, at a first time interval, comprising determining whether a fourth condition from the set of conditions is satisfied based on at least the monitored first parameter; and in response to determining that the fourth condition is satisfied, monitoring the first parameter at a third time interval, the third time interval being greater than the first time interval.

A seventh feature, combinable with any of the previous or following features, wherein the set of conditions includes multiple conditions combined with at least one logical operator.

In some implementations, the computer program product can be implemented on a non-transitory, computer-readable medium storing one or more instructions executable by a computer system to perform the above-described operations.

In a third implementation, a computer system, comprising: an initializer connected to multiple edge devices in an Internet of Things (IoT) system; and the multiple edge devices, each edge device associated with a processor, a memory, and at least one sensor, each sensor monitoring at least one parameter and the memory storing at least one set of conditions associated with other relationship to at least one other edge device, wherein a first edge device in the multiple edge devices is configured to perform operations comprising: monitoring, by the first edge device, at least a first parameter; determining whether a first condition from the set of conditions is satisfied based on at least the monitored first parameter; in response to determining that the first condition is satisfied, automatically transmitting a signal to a second edge device in the multiple edge devices to initiate monitoring of a second parameter.

The foregoing and other described implementations can each optionally include one or more of the following features:

A first feature, combinable with any of the following features, wherein an initializer connected to the multiple edge devices in the IoT system transmits a signal to the first edge device to initiate monitoring of the first parameter, and the first edge device is not monitoring the first parameter prior to the transmission of the signal from the initializer to the first edge device.

A second feature, combinable with any of the previous or following features, wherein the transmitted signal to the first edge device includes the set of conditions.

A third feature, combinable with any of the previous or following features, wherein the second edge device is not monitoring the second parameter prior to the transmission of the signal from the first edge device to the second edge device.

A fourth feature, combinable with any of the previous or following features, comprising determining whether a second condition from the set of conditions is satisfied; and in response to determining that the second condition is satisfied, automatically transmitting a signal to the second edge device to stop monitoring of the second parameter.

A fifth feature, combinable with any of the previous or following features, wherein the first edge device monitors the first parameter over time at a first time interval, comprising determining whether a third condition from the set of conditions is satisfied based on at least the monitored first parameter; and in response to determining that the third condition is satisfied, monitoring the first parameter at a second time interval, the second time interval being less than the first time interval.

A sixth feature, combinable with any of the previous or following features, wherein the first edge device monitors the first parameter over time at a first time interval, comprising determining whether a fourth condition from the set of conditions is satisfied based on at least the monitored first parameter; and in response to determining that the fourth condition is satisfied, monitoring the first parameter at a third time interval, the third time interval being greater than the first time interval.

A seventh feature, combinable with any of the previous or following features, wherein the set of conditions includes multiple conditions combined with at least one logical operator.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:

an initializer connected to a plurality of edge devices in an Internet of Things (IoT) system, wherein the initializer transmits a first signal to a first edge device in the plurality of edge devices to initiate monitoring of a first parameter; and the plurality of edge devices, each edge device associated with a processor, a memory, and at least one sensor, each sensor monitoring at least one environmental parameter external to the edge device and the memory storing at least one set of conditions associated with other relationship to at least one other edge device, wherein the first edge device in the plurality of edge devices is configured to:

after receiving the first signal from the initializer:
  monitor at least a first parameter;
  determine whether a first condition from the set of conditions is satisfied based on at least the monitored first parameter; and
  in response to determining that the first condition is satisfied, automatically transmit a second signal to a second edge device in the plurality of edge devices to initiate monitoring of a second parameter, wherein the second edge device starts to monitor at least the second parameter after receiving the second signal from the first edge device instead of from the initializer, and wherein the second parameter is different from the first parameter.

2. The system of claim 1, wherein the first edge device is not monitoring the first parameter prior to the transmission of the first signal from the initializer to the first edge device.

3. The system of claim 2, wherein the transmitted first signal to the first edge device includes the set of conditions.

4. The system of claim 1, wherein the second edge device is not monitoring the second parameter prior to the transmission of the second signal from the first edge device to the second edge device.

5. The system of claim 1, wherein the first edge device is further configured to:
  determine whether a second condition from the set of conditions is satisfied; and
  in response to determining that the second condition is satisfied, automatically transmit a third signal to the second edge device to stop monitoring of the second parameter.

6. The system of claim 1, wherein the first edge device monitors the first parameter over time at a first time interval, and wherein the first edge device is further configured to:
  determine whether a third condition from the set of conditions is satisfied based on at least the monitored first parameter; and
  in response to determining that the third condition is satisfied, monitor the first parameter at a second time interval, wherein the second time interval is less than the first time interval.

7. The system of claim 1, wherein the first edge device monitors the first parameter over time at a first time interval, and wherein the first edge device is further configured to:
  determine whether a fourth condition from the set of conditions is satisfied based on at least the monitored first parameter; and
  in response to determining that the fourth condition is satisfied, monitor the first parameter at a third time interval, wherein the third time interval is greater than the first time interval.

8. The system of claim 1, wherein the set of conditions includes a plurality of conditions combined with at least one logical operator.

9. The system of claim 1, wherein the at least one environmental parameter includes at least one of temperature or humidity.

10. The system of claim 1, wherein the first edge device and the second edge device are peer edge devices.

11. A computerized method performed by one or more processors, the method comprising:
  monitoring, by a first edge device in a plurality of edge devices, at least a first parameter after receiving a first signal from an initializer, wherein the initializer is connected to the plurality of edge devices, and wherein the initializer transmits the first signal to the first edge device to initiate monitoring of the first parameter;
  determining, by the first edge device, whether a first condition from one set of conditions is satisfied based on at least the monitored first parameter; and
  in response to determining that the first condition is satisfied, automatically transmitting, by the first edge device, a second signal to a second edge device in the plurality of edge devices to initiate monitoring of a second parameter, wherein the second edge device starts to monitor at least the second parameter after receiving the second signal from the first edge device instead of from the initializer, and wherein the first and second parameters are different environmental parameters external to the first and second edge devices.

12. The computerized method of claim 11, wherein the first edge device is not monitoring the first parameter prior to the transmission of the first signal from the initializer to the first edge device.

13. The computerized method of claim 12, wherein the transmitted first signal to the first edge device includes the set of conditions.

14. The computerized method of claim 11, wherein the second edge device is not monitoring the second parameter prior to the transmission of the second signal from the first edge device to the second edge device.

15. The computerized method of claim 11, further comprising:
  determining whether a second condition from the set of conditions is satisfied; and
  in response to determining that the second condition is satisfied, automatically transmitting a third signal to the second edge device to stop monitoring of the second parameter.

16. The computerized method of claim 11, wherein the first edge device monitors the first parameter over time at a first time interval, further comprising:
  determining whether a third condition from the set of conditions is satisfied based on at least the monitored first parameter; and
  in response to determining that the third condition is satisfied, monitoring the first parameter at a second time interval, wherein the second time interval is less than the first time interval.

17. The computerized method of claim 11, wherein the first edge device monitors the first parameter over time at a first time interval, further comprising:
  determining whether a fourth condition from the set of conditions is satisfied based on at least the monitored first parameter; and
  in response to determining that the fourth condition is satisfied, monitoring the first parameter at a third time interval, wherein the third time interval is greater than the first time interval.

18. The computerized method of claim 11, wherein the set of conditions includes a plurality of conditions combined with at least one logical operator.

19. A non-transitory computer storage medium encoded with a computer program, the program comprising instructions that, when executed by one or more computers, cause the one or more computers to perform operations comprising:
  monitoring, by a first edge device in a plurality of edge devices, at least a first parameter after receiving a first signal from an initializer, wherein the initializer is connected to the plurality of edge devices, and wherein the initializer transmits the first signal to the first edge device to initiate monitoring of the first parameter;

determining, by the first edge device, whether a first condition from one set of conditions is satisfied based on at least the monitored first parameter; and in response to determining that the first condition is satisfied, automatically transmitting, by the first edge device, a second signal to a second edge device in the plurality of edge devices to initiate monitoring of a second parameter, wherein the second edge device starts to monitor at least the second parameter after receiving the second signal from the first edge device instead of from the initializer, and wherein the first and second parameters are different environmental parameters external to the first and second edge devices.

20. The non-transitory computer storage medium of claim 19, wherein the first edge device is not monitoring the first parameter prior to receiving the first signal from the initializer.

* * * * *